United States Patent [19]
Ng

[11] Patent Number: 6,031,559
[45] Date of Patent: Feb. 29, 2000

[54] HYBRID IMAGING METHOD AND APPARATUS TO REDUCE CONTOURING AND DENSITY REVERSAL

[75] Inventor: Yee S. Ng, Fairport, N.Y.

[73] Assignee: Eastman Kodak Company, Rochester, N.Y.

[21] Appl. No.: 09/000,894

[22] Filed: Dec. 30, 1997

[51] Int. Cl.[7] .................................................. H04N 1/40
[52] U.S. Cl. ........................ 347/251; 347/240; 347/252; 347/253; 358/455; 358/456
[58] Field of Search .................... 347/240, 251, 347/252, 253, 143, 144; 358/455, 456

[56] References Cited

U.S. PATENT DOCUMENTS

| | | | |
|---|---|---|---|
| 4,746,941 | 5/1988 | Pham et al. | 395/108 |
| 4,750,010 | 6/1988 | Ayers et al. | 347/237 |
| 5,657,069 | 8/1997 | Kelly et al. | 347/237 |

Primary Examiner—N. Le
Assistant Examiner—Hai C. Pham
Attorney, Agent, or Firm—Norman Rushefsky

[57] ABSTRACT

A non-impact recording method and apparatus comprises recording grey level pixels using a recording element in accordance with a selectable combination of recording element on-time and intensity wherein at least some pixels are recorded using the recording element so that a pixel of one density is recorded using a different recording element on-time and a different intensity than used for recording a pixel recorded at a second density, the selectable combination being predetermined in accordance with a multi-bit signal representing a grey level of the pixel to be recorded. The recording element also records certain other pixels represented by multi-bit signals that define the same grey level using different combinations of on-time and duration to form pixels of different densities over an image area which pixels tend to average out to the density defined by the multi-bit signal for the certain other pixels.

18 Claims, 8 Drawing Sheets

| | CASE 1 (THEORETICAL) | | | CASE 2 (PRACTICAL) | | |
|---|---|---|---|---|---|---|
| EVENT | EX-POSURE TIME | EXPOSURE INTENSITY | HYBRID EX-POSURE | EX-POSURE TIME | EXPOSURE INTENSITY | HYBRID EX-POSURE |
| 1 | 1 | 1 | 1 | 0.6 | 1 | 0.6 |
| 2 | 2 | 1 | 2 | 1.6 | 1 | 1.6 |
| 3 | 3 | 1 | 3 | 2.6 | 1 | 2.6 |
| 4 | 4 | 1 | 4 | 3.6 | 1 | 3.6 |
| 5 | 5 | 1 | 5 | 4.8 | 1 | 4.8 |
| 6 | 6 | 1 | 6 | 5.9 | 1 | 5.9 |
| 7 | 7 | 1 | 7 | 7 | 1 | 7 |
| 8 | 8 | 1 | 8 | 8 | 1 | 8 |
| 9 | 9 | 1 | 9 | 9 | 1 | 9 |
| 10 | 10 | 1 | 10 | 10 | 1 | 10 |
| 11 | 3.667 | 3 | 11.001 | 3.26 | 3 | 9.78 |
| 12 | 4 | 3 | 12 | 3.6 | 3 | 10.8 |
| 13 | 4.333 | 3 | 12.999 | 4 | 3 | 12 |
| 14 | 4.667 | 3 | 14.001 | 4.467 | 3 | 13.401 |
| 15 | 5 | 3 | 15 | 4.8 | 3 | 14.4 |
| 16 | 5.333 | 3 | 15.999 | 5.133 | 3 | 15.399 |
| 17 | 5.667 | 3 | 17.001 | 5.567 | 3 | 16.701 |
| 18 | 6 | 3 | 18 | 5.9 | 3 | 17.7 |
| 19 | 6.333 | 3 | 18.999 | 6.333 | 3 | 18.999 |
| 20 | 6.667 | 3 | 20.001 | 6.667 | 3 | 20.001 |
| 21 | 7 | 3 | 21 | 7 | 3 | 21 |
| 22 | 7.333 | 3 | 21.999 | 7.333 | 3 | 21.999 |
| 23 | 7.667 | 3 | 23.001 | 7.667 | 3 | 23.001 |
| 24 | 8 | 3 | 24 | 8 | 3 | 24 |
| 25 | 8.333 | 3 | 24.999 | 8.333 | 3 | 24.999 |
| 26 | 8.667 | 3 | 26.001 | 8.667 | 3 | 26.001 |
| 27 | 9 | 3 | 27 | 9 | 3 | 27 |
| 28 | 9.333 | 3 | 27.999 | 9.333 | 3 | 27.999 |
| 29 | 9.667 | 3 | 29.001 | 9.667 | 3 | 29.001 |

FIG. 5b

| | CASE 1 (THEORETICAL) | | | CASE 2 (PRACTICAL) | | |
|---|---|---|---|---|---|---|
| EVENT | EXPOSURE TIME | EXPOSURE INTENSITY | HYBRID EXPOSURE | EXPOSURE TIME | EXPOSURE INTENSITY | HYBRID EXPOSURE |
| 30 | 10 | 3 | 30 | 10 | 3 | 30 |
| 31 | 5.167 | 6 | 31.002 | 4.967 | 5.9 | 29.3053 |
| 32 | 5.333 | 6 | 31.998 | 5.133 | 5.9 | 30.2847 |
| 33 | 5.5 | 6 | 33 | 5.4 | 5.9 | 31.86 |
| 34 | 5.667 | 6 | 34.002 | 5.567 | 5.9 | 32.8453 |
| 35 | 5.8333 | 6 | 34.9998 | 5.7333 | 5.9 | 33.82647 |
| 36 | 6 | 6 | 36 | 5.9 | 5.9 | 34.81 |
| 37 | 6.1667 | 6 | 37.0002 | 6.0667 | 5.9 | 35.79353 |
| 38 | 6.333 | 6 | 37.998 | 6.273 | 5.9 | 37.0107 |
| 39 | 6.5 | 6 | 39 | 6.5 | 5.9 | 38.35 |
| 40 | 6.667 | 6 | 40.002 | 6.667 | 5.9 | 39.3353 |
| 41 | 6.833 | 6 | 40.998 | 6.833 | 5.9 | 40.3147 |
| 42 | 7 | 6 | 42 | 7 | 5.9 | 41.3 |
| 43 | 7.167 | 6 | 43.002 | 7.167 | 5.9 | 42.2853 |
| 44 | 7.333 | 6 | 43.998 | 7.333 | 5.9 | 43.2647 |
| 45 | 7.5 | 6 | 45 | 7.5 | 5.9 | 44.25 |
| 46 | 7.667 | 6 | 46.002 | 7.667 | 5.9 | 45.2353 |
| 47 | 7.833 | 6 | 46.998 | 7.833 | 5.9 | 46.2147 |
| 48 | 8 | 6 | 48 | 8 | 5.9 | 47.2 |
| 49 | 8.1667 | 6 | 49.0002 | 8.1667 | 5.9 | 48.18353 |
| 50 | 8.333 | 6 | 49.998 | 8.333 | 5.9 | 49.1647 |
| 51 | 8.5 | 6 | 51 | 8.5 | 5.9 | 50.15 |
| 52 | 8.667 | 6 | 52.002 | 8.667 | 5.9 | 51.1353 |
| 53 | 8.833 | 6 | 52.998 | 8.833 | 5.9 | 52.1147 |
| 54 | 9 | 6 | 54 | 9 | 5.9 | 53.1 |
| 55 | 9.1667 | 6 | 55.0002 | 9.1667 | 5.9 | 54.08353 |
| 56 | 9.333 | 6 | 55.998 | 9.333 | 5.9 | 55.0647 |
| 57 | 9.5 | 6 | 57 | 9.5 | 5.9 | 56.05 |
| 58 | 9.667 | 6 | 58.002 | 9.667 | 5.9 | 57.0353 |
| 59 | 9.833 | 6 | 58.998 | 9.833 | 5.9 | 58.0147 |
| 60 | 10 | 6 | 60 | 10 | 5.9 | 59 |

CASE 2 (PRACTICAL)

| EXPOSURE TIME | EXPOSURE INTENSITY | HYBRID EXPOSURE | % OF OCCURANCES | EFFECTIVE EXPOSURE |
|---|---|---|---|---|
| 8 | 1 | 8 | 14.2857 | 1.142856 |
| 9 | 1 | 9 | 14.2857 | 1.285713 |
| 10 | 1 | 10 | 14.2857 | 1.42857 |
| 3.26 | 3 | 9.78 | 14.2857 | 1.397141 |
| 3.6 | 3 | 10.8 | 14.2857 | 1.542856 |
| 4 | 3 | 12 | 14.2857 | 1.714284 |
| 4.467 | 3 | 13.401 | 14.2857 | 1.914427 |
| | | | SUM EXP 3= | 10.42585 (PRACTICAL) |

CASE 1 (THEORETICAL)

| EXPOSURE TIME | EXPOSURE INTENSITY | HYBRID EXPOSURE | % OF OCCURANCES | EFFECTIVE EXPOSURE |
|---|---|---|---|---|
| 8 | 1 | 8 | 14.2857 | 1.142856 |
| 9 | 1 | 9 | 14.2857 | 1.285713 |
| 10 | 1 | 10 | 14.2857 | 1.42857 |
| 3.667 | 3 | 11.001 | 14.2857 | 1.571569857 |
| 4 | 3 | 12 | 14.2857 | 1.714284 |
| 4.333 | 3 | 12.999 | 14.2857 | 1.856998143 |
| 4.667 | 3 | 14.001 | 14.2857 | 2.000140857 |
| | | | SUM EXP 4= | 11.00013186 (THEORETICAL) |

FIG. 6

CASE 4 (PRACTICAL)

| EXPOSURE TIME | EXPOSURE INTENSITY | HYBRID EXPOSURE | % OF OCCURANCES | EFFECTIVE EXPOSURE |
|---:|---:|---:|---:|---:|
| 9.333 | 3 | 27.999 | 14.2857 | 3.999853 |
| 9.667 | 3 | 29.001 | 14.2857 | 4.142996 |
| 10 | 3 | 30 | 14.2857 | 4.28571 |
| 4.967 | 5.9 | 29.3053 | 14.2857 | 4.186467 |
| 5.133 | 5.9 | 30.2847 | 14.2857 | 4.326381 |
| 5.4 | 5.9 | 31.86 | 14.2857 | 4.551424 |
| 5.567 | 5.9 | 32.8453 | 14.2857 | 4.692181 |
| | | | SUM EXP 5= | 30.18501 (PRACTICAL) |

CASE 3 (THEORETICAL)

| EXPOSURE TIME | EXPOSURE INTENSITY | HYBRID EXPOSURE | % OF OCCURANCES | EFFECTIVE EXPOSURE |
|---:|---:|---:|---:|---:|
| 9.333 | 3 | 27.999 | 14.2857 | 3.999853143 |
| 9.667 | 3 | 29.001 | 14.2857 | 4.142995857 |
| 10 | 3 | 30 | 14.2857 | 4.28571 |
| 5.167 | 6 | 31.002 | 14.2857 | 4.428852714 |
| 5.333 | 6 | 31.998 | 14.2857 | 4.571138286 |
| 5.5 | 6 | 33 | 14.2857 | 4.714281 |
| 5.667 | 6 | 34.002 | 14.2857 | 4.857423714 |
| | | | SUM EXP 6= | 31.00025471 (THEORETICAL) |

HYBRID IMAGING METHOD AND APPARATUS TO REDUCE CONTOURING AND DENSITY REVERSAL

FIELD OF THE INVENTION

The invention relates to a method and apparatus for non-impact printing.

BACKGROUND OF THE INVENTION

In the art of non-impact printing it is known to selectively activate recording elements such as LEDs or a laser to control exposure of a recording medium. In order to activate the recording element(s) a driving system is provided to control exposure time and intensity of a selected recording element for recording each pixel.

Figure 1A:
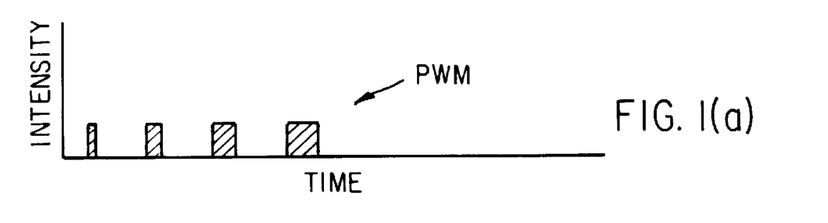
FIG. 1(a) is a graph illustrating examples of different pulsewidth modulation durations at constant intensity of a recording element for recording different pixels.
Figure 1B:
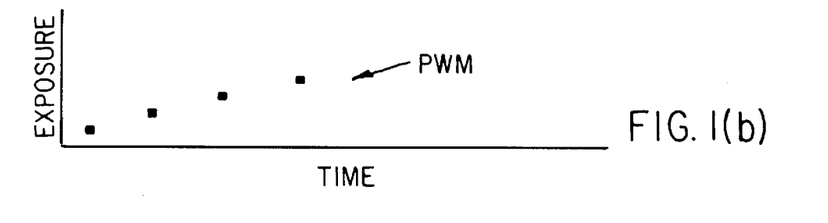
FIG. 1(b) is a graph illustrating a relationship of relative exposures of the pixels recorded on an image recording member by the recording element in accordance with the different pulsewidth durations of FIG. 1(a)
Figure 2A:
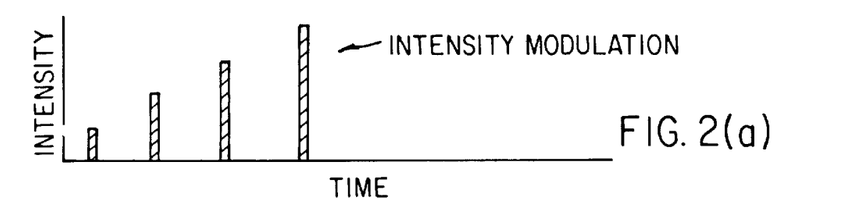
FIG. 2(a) is a graph illustrating examples of different intensity levels or modulations each at a constant duration period of a recording element for recording different pixels.
Figure 2B:
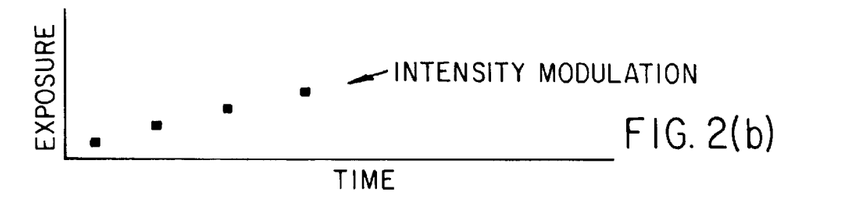
FIG. 2(b) is a graph illustrating a relationship of relative exposures of the pixels recorded on an image recording member by the recording element in accordance with the different intensity modulations of FIG. 2(a)
Figure 3A:
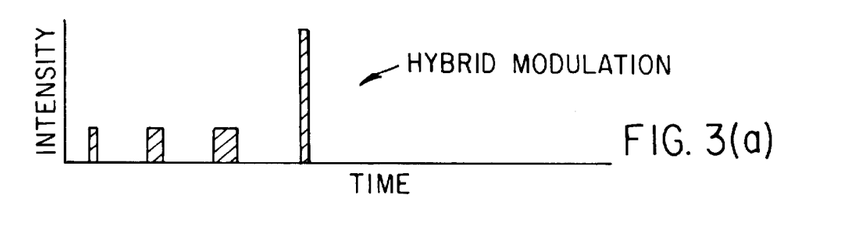
FIGS. 3(a) and 3(b) are graphs illustrating examples of a hybrid exposure system wherein a recording element can record a pixel by a combination of a selected one of several exposure on-times (pulsewidth modulation) and a selected one of several intensity levels or modulations.
Figure 3B:
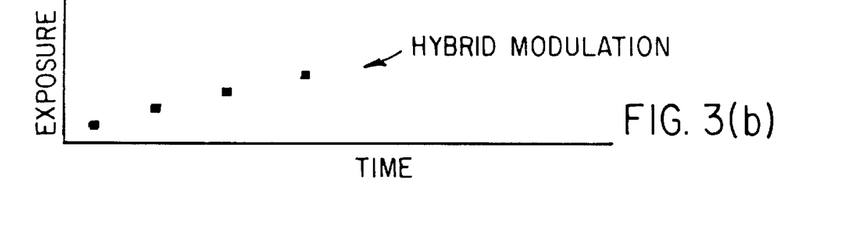
Figure 4:
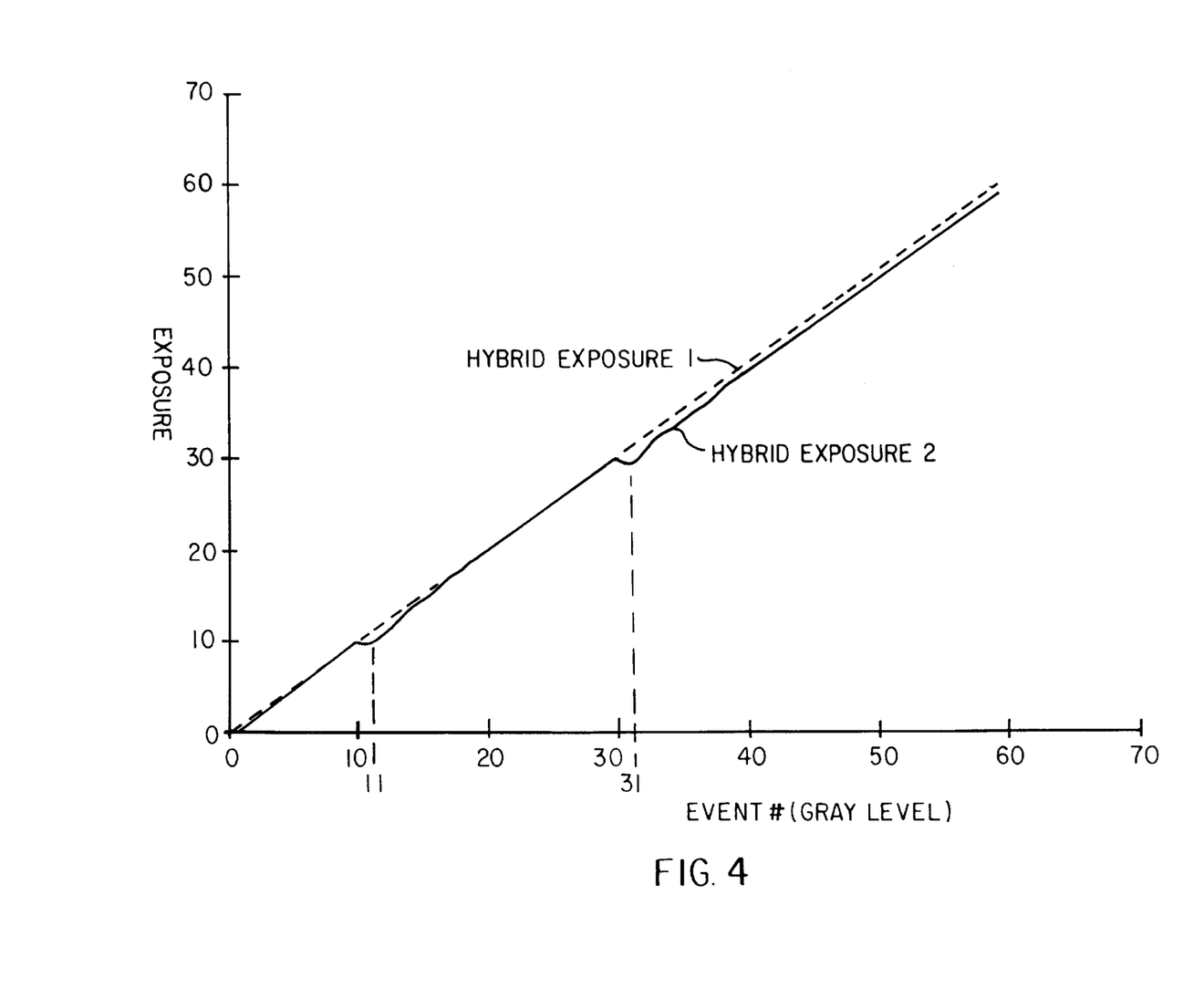
FIG. 4 is a graph illustrating exposure versus event or grey level in a hybrid exposure system for the case of a theoretical example of a system and in a practical system wherein at events 11 and 31 there is found to be a decrease in expected exposure compared to the theoretical case.

A hybrid driving system featuring modulation of both the exposure time and the exposure intensity are often used as either LED writers and laser printing systems to extend the exposure dynamic range of an imaging system (compared to when only exposure modulation is used or pulsewidth modulation (PWM) is used) and have the potential to create many levels of grey at the same time (so as to reduce density contouring). Cases for PWM, intensity modulation and hybrid modulation and their resultant exposure are shown in FIGS. 1, 2 and 3 respectively. However, due to system non-linearity and noise in measurement (when we characterize the exposure in intensity and exposure time) and cross-talk problems in actual usage (such as caused by current starvation), switching from one intensity level to the higher intensity level while lowering the exposure time to give you the next gradation does not necessarily generate the desired result of density increase. So instead of the density resulting from the exposure continuing to go up, it may actually go down (or there is a discontinuity in density direction of change) at the boundary of the intensity and exposure time switching. The result is some density contouring or some noticeable density discontinuity at those switchover points in printing (see FIG. 4). In more detail, we have shown in the table of FIG. 5 that between events 10 and 11 when the rise and fall time effect is there (in case 2 for a practical case) versus a theoretical estimate (in case 1), the switching of intensity of the hybrid approach can cause in the practical case a density reversal (even though the intensity change was accurate). This is the case since rise and fall time effect has more impact on shorter exposure times than longer exposure times. In another situation, such as events 30 and 31 when there is a slight intensity estimation error (either due to a temperature effect or brightness/drive current non-linearity), density reversal can occur. In this case, both the rise/fall time effect and intensity estimation error is included. These events are shown as density reversal at events 11 and 31 in FIG. 5. One may have noticed that the problem of density reversal would not occur if only pulsewidth or intensity is changing by itself monotonically, i.e. changing in one direction only.

SUMMARY OF THE INVENTION

Therefore, an object of the invention is to provide a method and apparatus for non-impact recording using a hybrid system that can reduce this density reversal (or contouring) problem even if the drive system has a quantization error in either the intensity measurement (or drive uniformity) or PWM miscalculation (due to rise time, ringing, etc.). In order to avoid the quantization problem in switching from pure PWM or pure intensity modulation to a hybrid approach, one would use a mixture of available levels (an exposure combination of intensity and exposure time) in the transition region of switching to ensure less problem in density reversal contouring, etc. So instead of just switching from say an exposure of I1*T1 to I2*T2 (where T2<T1 and I2>I1) at one level, we may use for pixels of certain densities a weighted combination of exposures of (T*I) to give a more gradual change to ensure no density reversal in hybrid imaging.

BRIEF DESCRIPTION OF THE DRAWINGS

In the detailed description of the invention presented below, reference is made to the accompanying drawings wherein.

DETAILED DESCRIPTION OF THE INVENTION

Because apparatus of the type described herein are generally well known, the present description will be directed, in particular, to elements forming part of, or cooperating more directly to the present invention. Apparatus not specifically shown or described herein are selectable from those known in the prior art.

Figures 5, 5A:
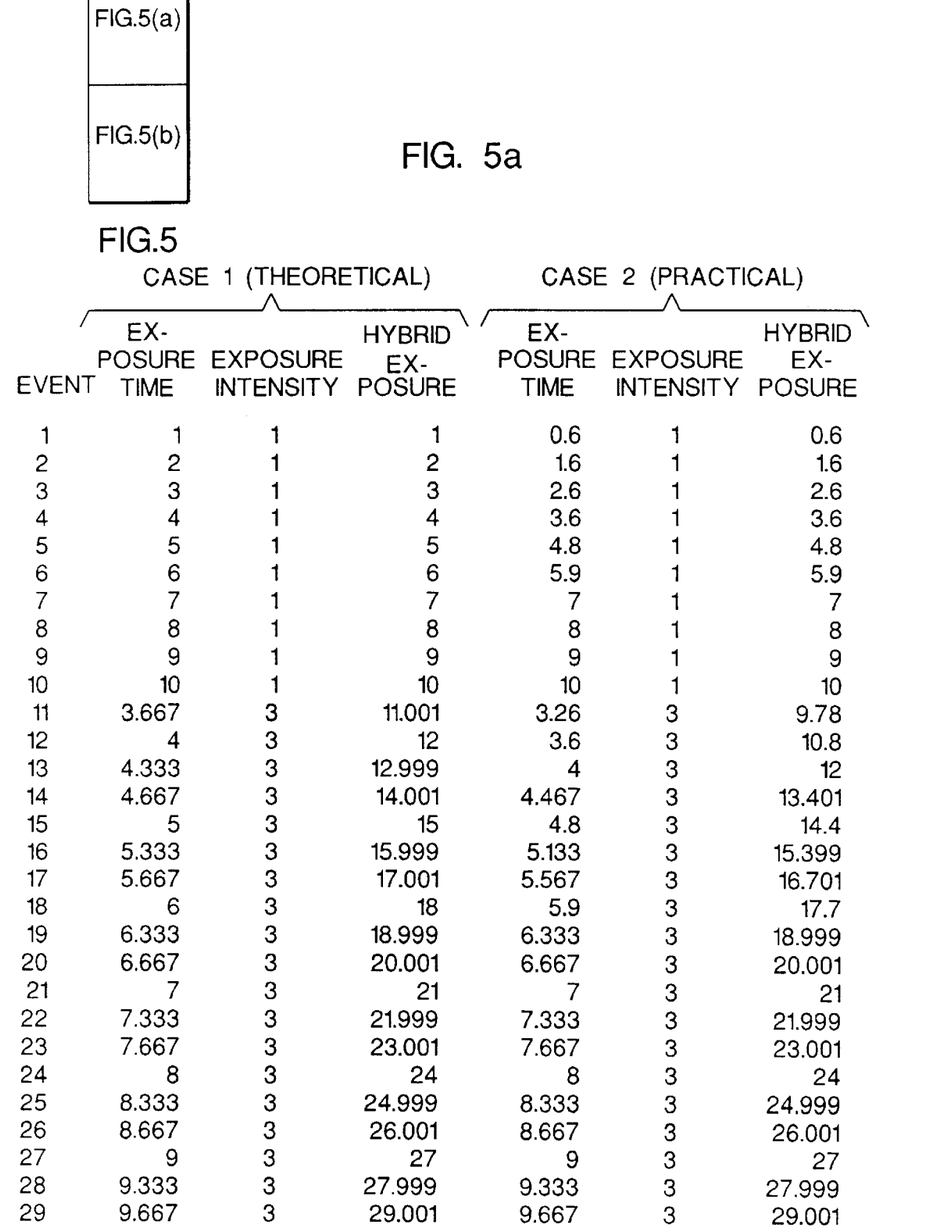
FIGS. 5 and 5(a) and 5(b) are tables illustrating for case 1 (theoretical examples) and for case 2 (practical examples) of exposure time and intensity and the resulting exposure for a hybrid exposure system, the data of event or grey level versus hybrid exposure is plotted in the graph of FIG. 4.
Figure 6:
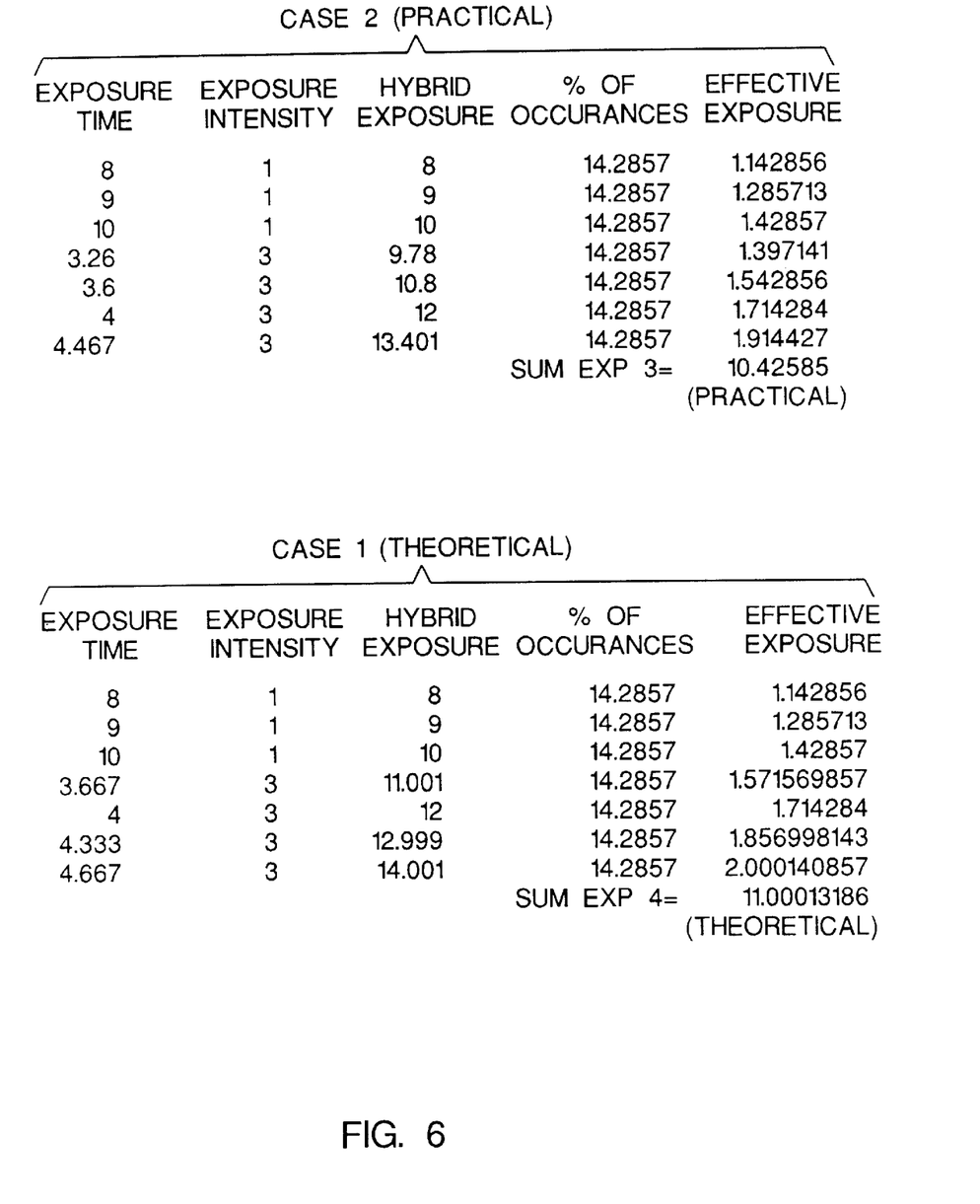
FIG. 6 is a table illustrating in accordance with the invention an exposure scheme for the case of event 11 of a hybrid exposure system to provide a resulting effective exposure that is closer to the desired theoretical exposure for event 11.

In the case of events 10 and 11, let us examine in detail one of the implementations of this method in the table of FIG. 6. In the case of event 10, the hybrid exposure is 10 (with an exposure time of 10 and an intensity of 1). For event 11, if we just use the usual way for hybrid imaging, a practical case with the usual limitation in exposure rise/fall time as shown in hybrid exposure case 2 in the table of FIG. 5(*a*) will show a hybrid exposure of 9.78 (exposure time of 3.26 and exposure intensity of 3) which gives rise to density reversal between grey level 10 and grey level 11. The invention proposes that, since it is known for which events or grey levels of pixels to be recorded whose recording density will effectively be below that of a lesser event for grey level recorded pixel, correction for such recording can be made within an overall area of an image by using various combinations of hybrid exposure parameters to provide an average density that is closer to target for all the pixels of that particular grey level that are recorded in the area. If we are in fact making use of the exposures (in this case, 7 of them) around the original exposure request (event 11) and let us assume for a moment that we use those exposures (hybrid exposure practical case of FIG. 6) in an evenly weighted fashion (14.28% for each of the 7 exposures). The accumulated sum of the effective exposure would be 10.42 which is larger than 10 (for event 10) and smaller than 10.8 (for event 12 in the table of FIG. 5(*a*) practical case). This method thus can be used to avoid density reversal in hybrid imaging.

Figure 5B:
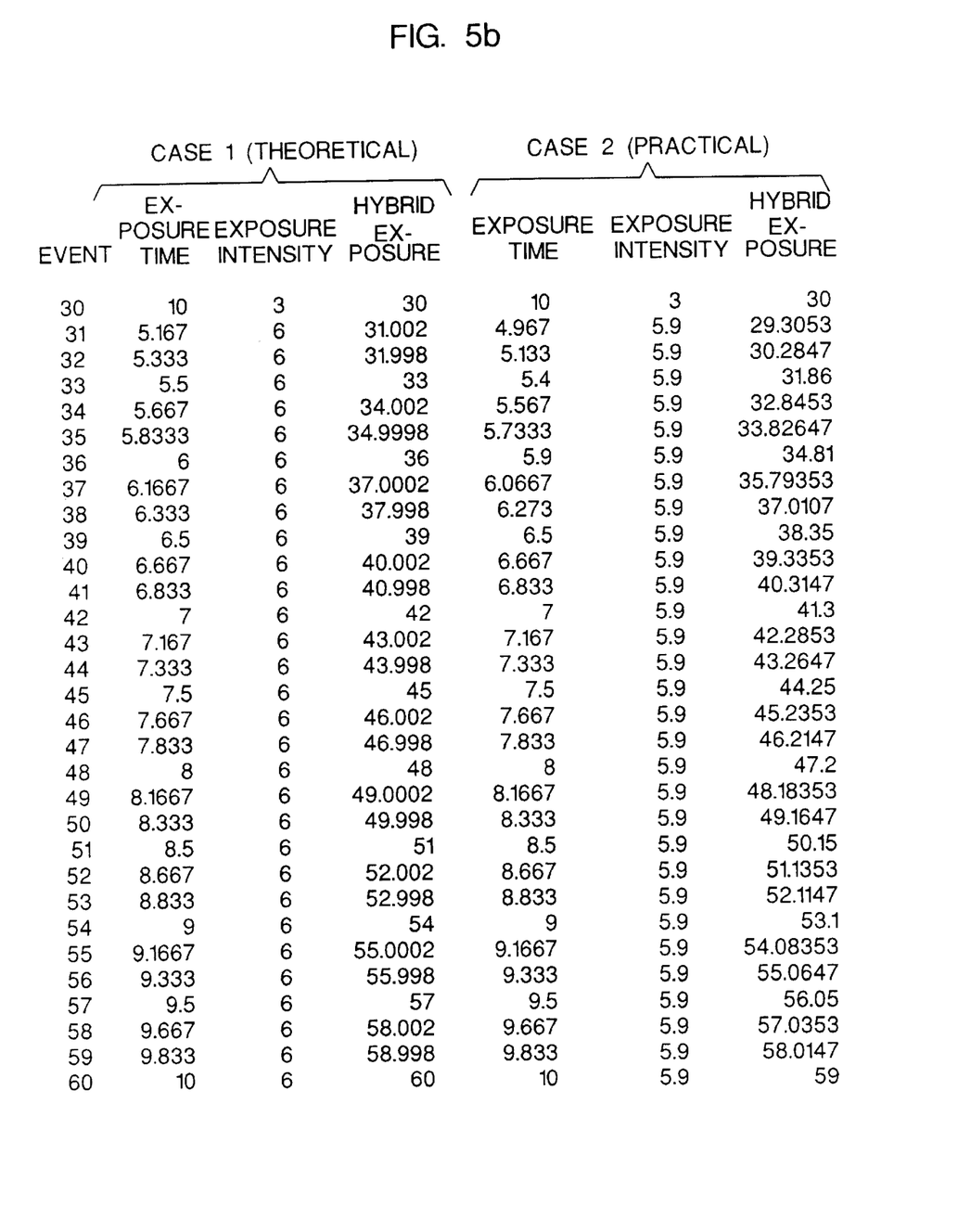
Figure 7:
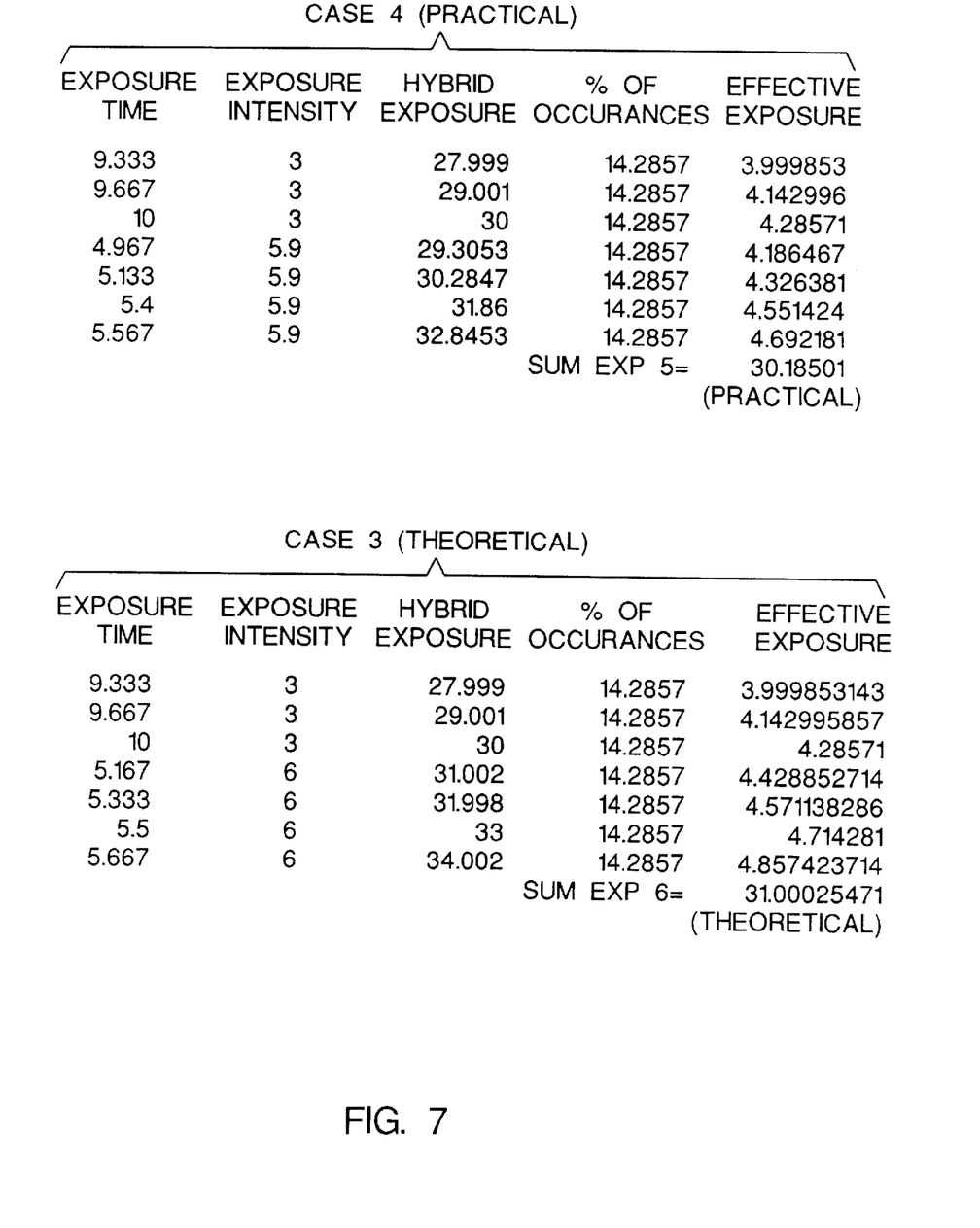
FIG. 7 is a table illustrating in accordance with the invention an exposure scheme used in FIG. 6 but for obtaining an effective exposure in the case of event 31 that is closer to the desired theoretical exposure for event 31.

Consider another case for events 30 and 31 (see FIG. 5(*b*) and FIG. 7). For event 30, the hybrid exposure is 30 (exposure time=10, intensity=3). For event 31, if we use the usual way for hybrid imaging, a hybrid exposure of 29.3 (with exposure time=4.967 and exposure intensity=5.9) would have resulted. So we will have a density reversal in this case. If now a similar method of making use of the exposures (in this case, 7 of them) around the original exposure request (event 31) and further assume that we use those exposures (hybrid exposure practical case in the table of FIG. 7) in an equally weighted fashion (14.28% for each of the 7 exposures). The accumulated sum of the effective exposure would be 30.185 which is larger than 30 (for event 30) and smaller than 30.28 (for event 32 in Table 1). So density reversal and contouring has again been reduced.

Of course one can use more or less than 7 exposures around the boundary exposure events. Also, more of the events around the boundary events may be treated the same way to improve robustness. Also, the weighting of the exposures around the boundary exposure event need not be the same for all of the exposures. Also, we can use other exposure values (including exposure combinations of I*T that give equivalent exposure as the boundary exposures (for example, T1*I1~T2*I2 and we can use a weighted amount of each to achieve an accumulated exposure as the boundary exposure) around the boundary exposures to increase system robustness against noises (measurement and non-linearity).

Figure 8:
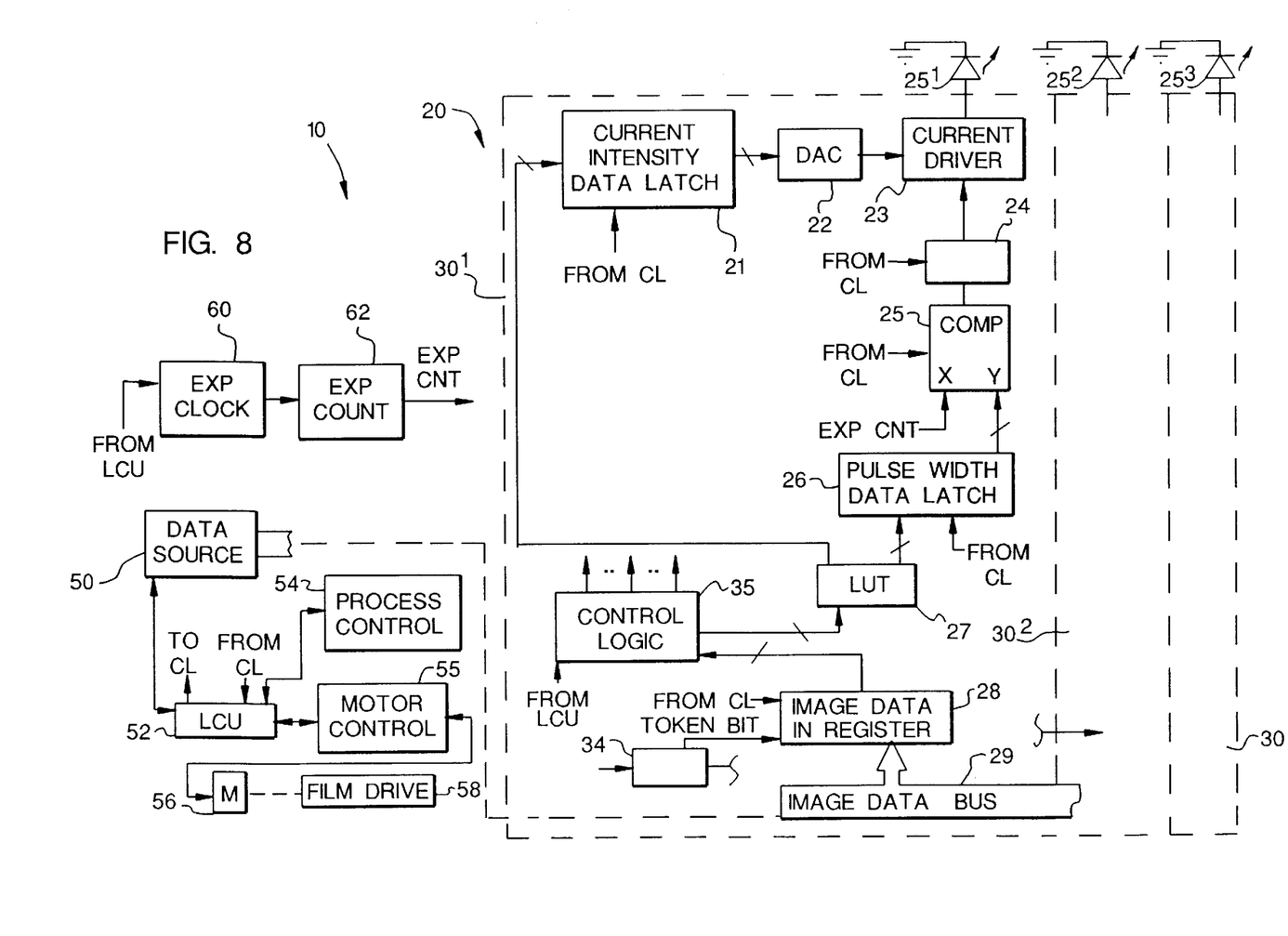
FIG. 8 is a block diagram schematic of an image recording apparatus that represents one embodiment of the apparatus of the invention.

The invention may be better understood with reference to a specific apparatus for implementing same, it being appreciated that the invention may be implemented with other types of apparatus. With reference now to FIG. 8, there is illustrated a block diagram of a portion of light emitting diode printhead. Typically such a printhead would have several thousand LEDs arranged in a row positioned so as to expose an image recording member which may be moved relative to the printhead so that the row of LEDs is arranged cross-track to movement of the recording member with the LEDs uniformly spaced apart to provide, for example, 600 LEDs to the inch. The image recording member is light sensitive and may be either a photographic film or paper or an electrophotoconductive (EP) member upon which a uniform primary electrostatic charge is present. If the image recording member is an EP member, then, as is well known, the LEDs are selectively activated to expose the member to image-wise modulate the electrostatic charge to form a latent electrostatic image on the member. The latent electrostatic image is than developed with toner and transferred to a receiver sheet. The toner image is then fused to the receiver sheet. The toner image may be developed in one or more colors. A lens such as a SELFOC lens, trademark of Nippon Sheet Glass Co., Ltd. may be used to focus the emitter outputs onto the image recording member.

In FIG. 8 the apparatus 10 includes an LED printhead 20 having a series of identical driver channels $30^1, 30^2, 30^3 \ldots 30^n$, wherein n is a number representing the number of LEDs on the printhead; n, for example, may be 5,000. The driver channels $30^1, 30^2, 30^3$ control the selective activation of a respective led $25^1, 25^2$ and $25^3$. Since the driver channels are identical, description will be provided below of driver channel $30^1$.

Figure 9:
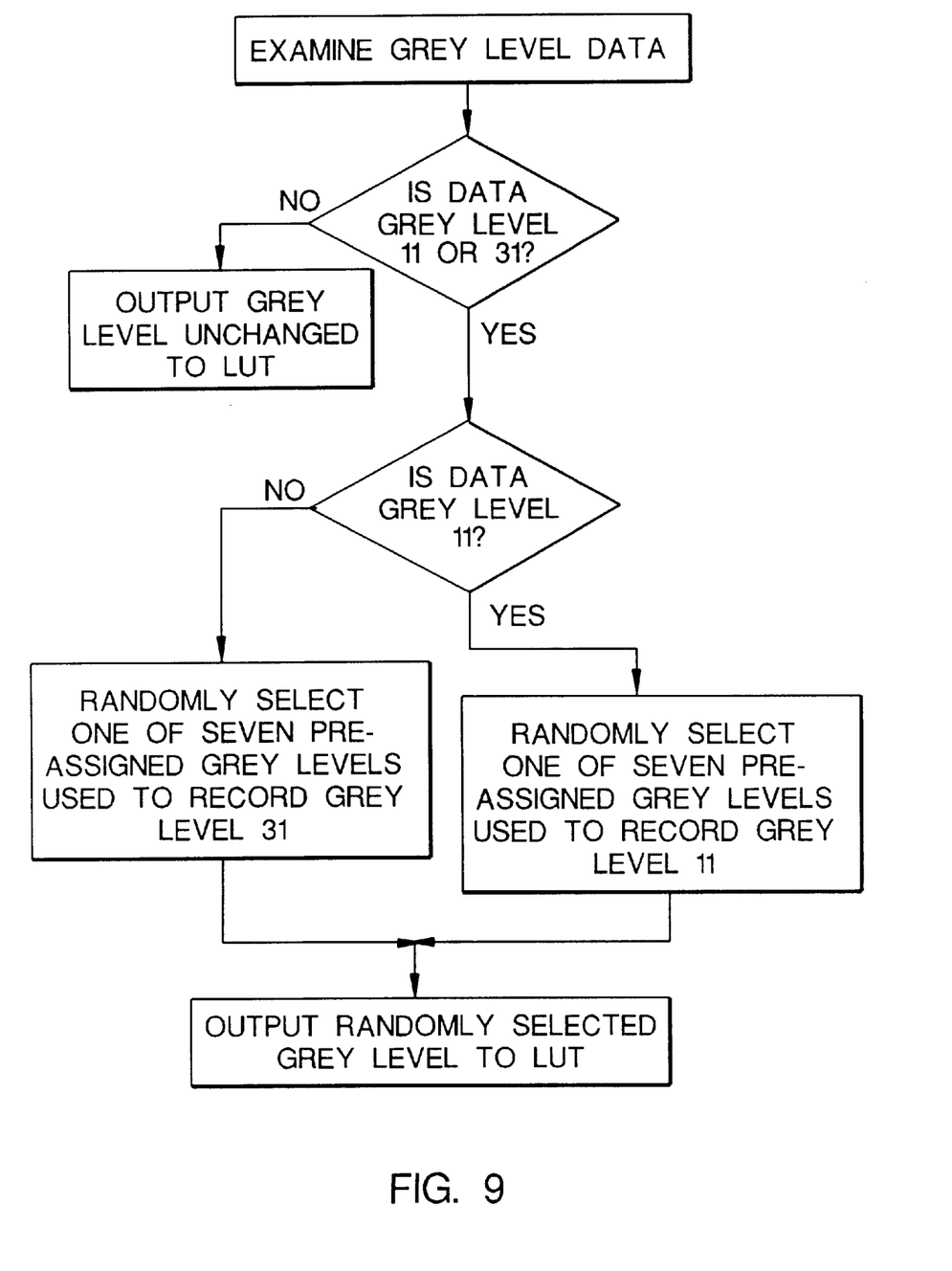
FIG. 9 is a flow chart of a logic operation provided by a control logic device in the apparatus of FIG. 8.

In order to selectively control activation of an LED, a data source 50 located off the printhead provides electronic signals representing the grey level of each pixel to be recorded. The data source may be a scanner, word processor, data file server or electronic image reader or any source that provides electronic information to be printed. The data source outputs the data onto an image data bus 29. A token bit is also provided so that data may be latched into a respective data in register associated with a respective channel that is used for recording the pixel. In this regard, reference is made to U.S. Pat. No. 4,746,941, the contents of which are incorporated herein by reference. Assume the image data for recording a pixel is represented by a multi-bit signal of 6 bits per pixel so that at least 60 different pixel density levels can be recorded by LED $25^1$. The 6 bits/pixel image data signal carried on bus 29 is latched in image data in register 28 in response to presence of a token bit in token bit register 34. The data is then output from the register 28 to a control logic 35. The control logic 35 includes various logic gates as is well known for controlling timing of various parts of a driver channel in response to control signals from a logic and control unit 52 located off the printhead. The control logic includes various additional logic gates to perform a relatively simple logic operation (see FIG. 9) of determining if the six bits per pixel image data signal is a grey level 11 or 31 since it is assumed that these are the only two grey levels wherein exposure errors are expected due to the reasons set forth above. If the image data represented by the 6 bits of information are not grey levels 11 or 31 then the control logic outputs the data unchanged as an address input to a look-up table (LUT) 27. If the control logic (CL) determines that the data is grey level 11 or 31, then for data of grey level 11 the CL randomly selects one of seven preassigned grey levels for recording a grey level 11 pixel; and if the data is grey level 31 the CL randomly selects one of seven different preassigned grey levels as a substitute for recording a grey level 31 pixel. The nature of the random selection need not be equally weighted. Thus, for example, in assigning a grey level in the case of an input grey level 11 the selection process for selecting a preassigned grey level for recording the grey level pixel 11 may be based on a weighting that is gaussian or a normal distribution about the center point of grey level 11. After randomly selecting one of the preassigned grey levels for recording a grey level pixel in response to an input of grey level 11 (or one of the preassigned grey levels that was randomly selected as a substitute for recording a grey level pixel 31 in response to an input of grey level 31) the selected grey level is output from the CL as an input address to the LUT 27. The LUT 27 includes for each incoming grey level data signal to be recorded a first multi-bit corresponding signal representing an exposure time and a second multi-bit corresponding signal representing an exposure intensity for recording the pixel.

Consider the case where the grey level of the pixel is not 11 or 31. In such a case, the input address to the LUT 27 will be the grey level data signal and the output of the LUT will be a first multi-bit signal that represents exposure time and this first multi-bit signal will be output to and latched in a pulsewidth data latch 26. A second multibit signal will also be output from the LUT in response to the grey level data signal. The second multi-bit data signal represents intensity and is output to and latched in a current data latch 21. In the table of theoretical values in FIGS. 5(a) and 5(b) there are 38 different exposure times that can be used and 3 different exposure intensity values. The grey level (event) of a pixel defines exposure time and intensity according to this table of theoretical values. The pulsewidth data value stored in latch 26 is input to one input (Y) of a comparator 25. A second input (X) of the comparator 25 is an exposure count input that is generated by an exposure counter 62 that is counting exposure clock pulses. Since the exposure times are not uniformly spaced in time, the exposure clock may be programmed as is well known in the patent literature, see U.S. Pat. No. 5,657,069, Kelly et al, to generate the exposure clock pulses at appropriate non-linear intervals to provide for the 38 different exposure times. In accordance with the technique disclosed in U.S. Pat. No. 4,750,010 and U.S. application Ser. No. 08/996,782, filed Dec. 23, 1997, in the names of Yee S. Ng et al, the comparator compares the pulsewidth data with the exposure count and outputs a signal to a latch or logic device 24 that enables a current driver 23. The level of current generated by the current driver 23 is determined by the current data stored in latch 21. This data is output to a digital-to-analog converter 22 which in turn provides an analog control signal that controls current generated by current driver 23. Thus, current to the LED will be determined by the intensity and pulsewidth signals. As noted in the table of FIGS. 5(a) and 5(b), for the practical case it may be that the exact intensity or exposure duration is not precisely controlled, but for all cases except for data signals 11 and 31 the density of a developed image resulting from an exposure will be reasonably accurate and not represent a decrease to a grey level below that of a next lower grey level.

In the case of a grey level data signal of 11, the LUT receives a randomly selected substitute grey level data signal from the CL as an input. This randomly selected substitute grey level represents one of the seven combinations of exposure times and intensities in the theoretical case of FIG. 6. Thus, certain pixels of grey level 11 will be recorded with the combination of exposure time 8 and exposure intensity 1 (grey level 8). Other pixels of grey level 11 (when the image data calls for same) will be recorded with another indicated combination such as exposure time 3.667 and exposure intensity 3 even though this is the problematic exposure (grey level 11). However, statistically, over the entire image (where many pixels of grey level 11 may be requested by the input data to the printhead) the result should appear better than using just the problematic exposure, since as can be seen from the tables, some combinations of intensity and time provide for an overexposure of the grey level 11 pixel and other combinations provide for an underexposure. However, as indicated for the practical case the statistical average will be about the right density. The LUT in response to the input of the randomly selected substitute grey level outputs the assigned combination data for that assigned grey level so that the pulsewidth data and current intensity data for that grey level are output to the latches 26 and 21 respectively. The current to the driver in the intensity level and pulse duration is controlled accordingly.

The case for recording image data of grey level 11 and 31 are analogous. In response to a randomly assigned substitute grey level for grey level 31 the LUT outputs a corresponding combination of data (current intensity and pulsewidth) for recording a pixel using the parameters of that combination which are assigned for that substitute grey level.

The other LEDs operate similarly for recording their respective pixels during the recording of a row of pixels in the cross-track or main scan direction of recording during a pixel recording interval. The film or photoconductive web or drum is moved either continuously or intermittently in accordance with movement of a film drive 58 that is in turn powered by a motor 56. The motor is subject to a motor control 55 which in turn is under the programmed control of the LCU as is well known. The LCU additionally controls various process control elements 54 of an electrophotographic system such as primary charger, development station, the LED writer, transfer station, fusing station and cleaning station as is also well known.

In lieu of control logic circuits, a computer or other programmable logic device may be used to control and determine the various operating parameters of the driver circuit to function in accordance with the teachings herein.

The invention can be used with one or more laser exposure sources instead of LEDs. The inventions is applicable to other types of systems such as thermal recording also.

The invention has been described in detail with particular reference to certain preferred embodiments thereof, but it will be understood that variations and modifications can be effected within the spirit and scope of the invention.

What is claimed is:

1. A non-impact recording apparatus comprising
  a recording element;
  a current driver circuit that drives the recording element at one selected intensity of plural selectable intensities in response to a first signal that determines a single selected intensity for recording a pixel;
  a pulsewidth controller that controls the current driver circuit for a single selected pixel recording pulsewidth duration in response to a second signal that determines the single selected pulsewidth duration of plural selectable pulsewidth durations for recording the pixel and the single selected pulsewidth duration is the only pulsewidth duration used for recording that pixel; and
  a signal generator responsive to a multi-bit signal representing a grey level of a pixel to be recorded and generating in response to the multi-bit signal the first signal and the second signal, the signal generator selecting for a predetermined multi-bit signal one of plural selectable combinations of first signals and second signals to provide different combinations of first signals and second signals when recording different pixels of an image in response to multi-bit signals representing the same grey level; and wherein at least some of said different pixels that are recorded in response to multi-bit signals representing the same grey level are each recorded using a different one of said combinations of a single selected intensity of the recording element and a single selected pulsewidth duration.

2. The apparatus of claim 1 wherein the signal generator is operative to determine randomly which combination of first signal and second signal is generated for the predetermined multi-bit signal.

3. The apparatus of claim 2 wherein the signal generator includes a look-up table that has input thereto as an address input a randomly selected multi-bit signal representing a grey level.

4. The apparatus of claim 1 wherein the recording element is a light-emitting diode.

5. The apparatus of claim 1 wherein the recording element is a laser.

6. The apparatus of claim 1 wherein the signal generator selects one of plural selectable combinations based on an equal weighting random selection.

7. The apparatus of claim 1 wherein the signal generator selects one of plural selectable combinations based on a non-equal weighting selection.

8. A non-impact recording apparatus comprising a recording element;

a current driver circuit that drives the recording element at one of plural selectable intensities in response to a first signal that determines a single selected intensity for recording a pixel;

a pulsewidth controller that controls the current driver circuit for a single selected pixel recording pulsewidth duration in response to a second signal that determines the single pulsewidth duration of plural selectable pulsewidth durations for recording the pixel and the single selected pulsewidth duration is the only pulsewidth duration used for recording that pixel; and a signal generator responsive to a multi-bit signal representing a grey level of a pixel to be recorded and generating in response to the multi-bit signal the first signal and the second signal, the signal generator for a predetermined multi-bit signal randomly selecting one of plural selectable combinations of first signals and second signals wherein the selectable combinations are suited for forming plural pixels over an image area which tend to average out to the density defined by the multi-bit signal.

9. The apparatus of claim 8 wherein the recording element is a light-emitting diode.

10. The apparatus of claim 8 wherein the recording element is a laser.

11. The apparatus of claim 8 wherein the signal generator selects one of plural selectable combinations based on an equal weighting random selection.

12. The apparatus of claim 8 wherein the signal generator selects one of plural selectable combinations based on a non-equal weighting selection.

13. A non-impact recording method for recording an image comprising recording grey level pixels using a recording element in accordance with a selectable combination of recording element on-time and selected intensity wherein at least some pixels are recorded using the recording element so that a pixel of one density is recorded using a single recording element on-time and a single selected intensity that are different than that used for recording a pixel recorded at a second density, the selectable combination being determined in accordance with a multi-bit signal representing a grey level of the pixel to be recorded and using the recording element to record certain other pixels in the image represented by multi-bit signals that define the same grey level to be recorded using different combinations of a single on-time and a single selected intensity to form pixels of different densities over an image area which pixels tend to average out to the density defined by the multi-bit signals for the certain other pixels and wherein each of the certain other pixels are formed through enablement of the recording element for only a single recording on-time of the recording element and for a single selected intensity of the recording element.

14. The method according to claim 13 wherein a combination of on-time and intensity for recording one of the certain other pixels is randomly selected from plural available combinations.

15. The method of claim 13 wherein the recording element is a light-emitting diode.

16. The method of claim 13 wherein the recording element is a laser.

17. The method of claim 13 wherein the signal generator selects one of plural selectable combinations based on an equal weighting random selection.

18. The method of claim 13 wherein the signal generator selects one of plural selectable combinations based on a non-equal weighting selection.

* * * * *